BEST AVAILABLE COPY
I. H. Coller,
Cutting Files.
No 185. A.I. Patented Jan. 12, 1856.
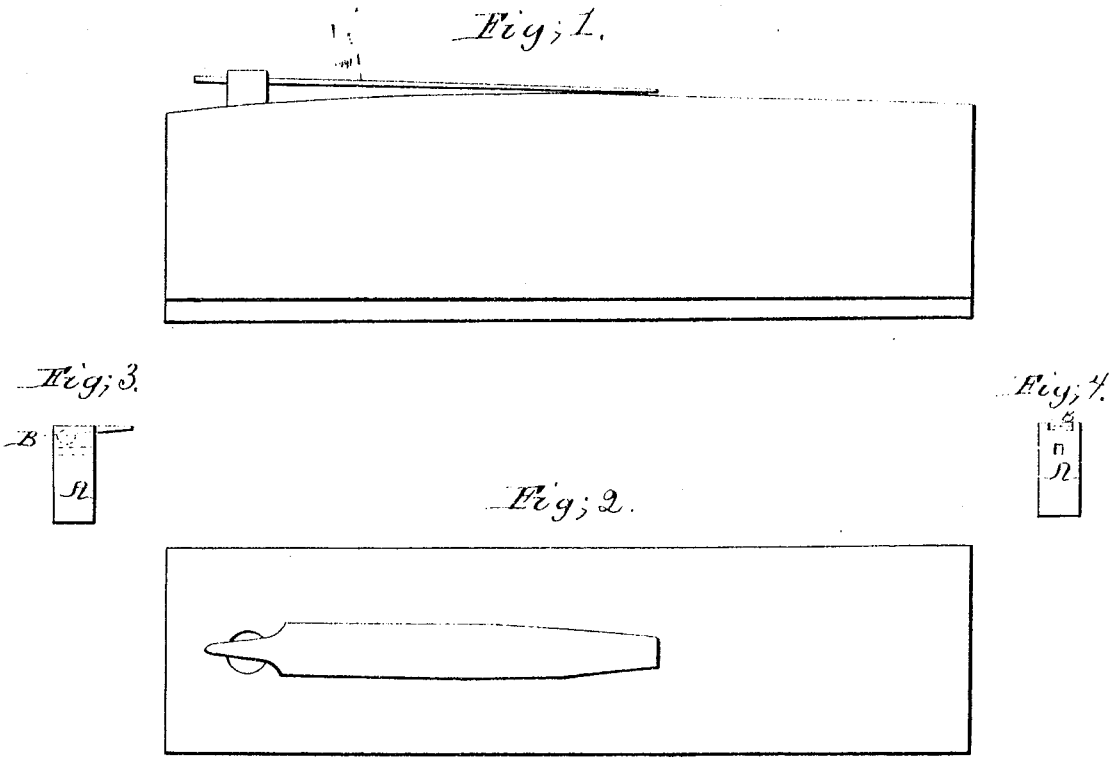
N. PETERS, PHOTO-LITHOGRAPHER, WASHINGTON, D. C.